(12) United States Patent
Wen et al.

(10) Patent No.: US 9,477,765 B2
(45) Date of Patent: Oct. 25, 2016

(54) SEARCH METHOD, SYSTEM AND DEVICE

(71) Applicant: TENCENT TECHNOLOGY (SHENZHEN) COMPANY LIMITED, Shenzhen (CN)

(72) Inventors: Xu Wen, Shenzhen (CN); Qiang Li, Shenzhen (CN); Rongfang Shao, Shenzhen (CN); Jianguo He, Shenzhen (CN); Yongliang Feng, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 349 days.

(21) Appl. No.: 14/165,481

(22) Filed: Jan. 27, 2014

(65) Prior Publication Data

US 2014/0143246 A1    May 22, 2014

Related U.S. Application Data

(63) Continuation of application No. PCT/CN2012/077684, filed on Jun. 28, 2012.

(30) Foreign Application Priority Data

Aug. 2, 2011    (CN) .......................... 2011 1 0219368

(51) Int. Cl.
*G06F 17/30*    (2006.01)
*G06F 7/00*    (2006.01)

(52) U.S. Cl.
CPC ... *G06F 17/30867* (2013.01); *G06F 17/30657* (2013.01); *G06F 17/30699* (2013.01)

(58) Field of Classification Search
CPC .................. G06F 17/30867; G06F 17/30657; G06F 17/30699

USPC ....................................................... 707/732
See application file for complete search history.

(56) References Cited

U.S. PATENT DOCUMENTS 8,843,481 B1 *    9/2014    Xu .................... G06F 17/30867
                                                              707/732
2006/0074980 A1    4/2006    Sarkar
(Continued)

FOREIGN PATENT DOCUMENTS

CN    101226528 A    7/2008
CN    101317173 A    12/2008
(Continued)

OTHER PUBLICATIONS

Office Action in Chinese Application No. 201110219368.3 dated Dec. 1, 2014.
(Continued)

*Primary Examiner* — Pavan Mamillapalli
(74) *Attorney, Agent, or Firm* — Marshall, Gerstein & Borun LLP

(57) ABSTRACT

Provided is a search method, system and device. The search method includes obtaining a keyword, a relationship chain classification and a user account that are inputted by a user; obtaining a user account list that corresponds to the obtained user account and belongs to the obtained relationship chain classification; and searching for information corresponding to the obtained keyword from information posted by each user account in the user account list to obtain a search result, and displaying the search result. By the search method, system and device, the practicability and reliability of information may be improved.

6 Claims, 2 Drawing Sheets

(56) References Cited

U.S. PATENT DOCUMENTS

| | | |
|---|---|---|
| 2007/0162432 A1 | 7/2007 | Armstrong et al. |
| 2008/0059455 A1* | 3/2008 | Canoy ............... G06F 17/30867 707/999.005 |
| 2008/0183694 A1* | 7/2008 | Cane ................. G06F 17/30867 707/999.005 |
| 2009/0055355 A1* | 2/2009 | Brunner ................ G06Q 30/02 707/999.003 |
| 2009/0204599 A1* | 8/2009 | Morris .............. G06F 17/30967 707/999.005 |
| 2009/0271374 A1 | 10/2009 | Korn et al. |
| 2011/0087661 A1* | 4/2011 | Quick ............... G06F 17/30554 707/732 |
| 2011/0184951 A1 | 7/2011 | Paparizos et al. |

FOREIGN PATENT DOCUMENTS

| | | |
|---|---|---|
| CN | 101329674 A | 12/2008 |
| CN | 101571864 A | 11/2009 |
| CN | 101571942 A | 11/2009 |
| JP | 2006-236165 A | 9/2006 |
| JP | 2009-238007 A | 10/2009 |
| JP | 2011-521329 A | 7/2011 |
| WO | WO-2009/134522 A1 | 11/2009 |
| WO | WO-2009/138755 A1 | 11/2009 |

OTHER PUBLICATIONS

Search Report in European Application No. 12819556.7 dated Apr. 30, 2015.

Office Action in Japanese Application No. 2014-523176 dated Feb. 9, 2015.

International Preliminary Report on Patentability and Written Opinion in International Application No. PCT/CN2012/077684 dated Feb. 4, 2014.

International Search Report for PCT/CN2012/077684 dated Sep. 20, 2012.

\* cited by examiner

SEARCH METHOD, SYSTEM AND DEVICE

This application is a continuation of International Application No. PCT/CN2012/077684, filed on Jun. 28, 2012. This application claims the benefit and priority of Chinese application No. 201110219368.3, filed on Aug. 2, 2011. The entire disclosures of each of the above applications are incorporated herein by reference.

FIELD OF THE INVENTION

The present disclosure relates to Internet technologies, and more particularly to a search method, system and device.

BACKGROUND OF THE INVENTION

At present, a search engine may have more and more functions. A user may search out a large amount of information through a search engine. For example, if the user inputs a keyword "Lijiang", the user may obtain a large amount of information about Lijiang. However, the obtained information may include some spam information and false information. Accordingly, the practicability and reliability of the obtained information cannot be guaranteed, and thus the user may obtain inaccurate information and even be deceived.

SUMMARY OF THE INVENTION

Examples of the present disclosure provide a search method, system and device, so as to improve the practicability and reliability of information.

The solution of the present disclosure is implemented as follows.

A search method includes:
obtaining a keyword, a relationship chain classification and a user account that are inputted by a user;
obtaining a user account list that corresponds to the obtained user account and belongs to the obtained relationship chain classification; and
searching for information corresponding to the obtained keyword from information posted by each user account in the user account list to obtain a search result, and displaying the search result.

A search system includes:
a search device, configured to obtain a keyword, a relationship chain classification and a user account that are inputted by a user, obtain a user account list that corresponds to the obtained user account and belongs to the obtained relationship chain classification, search for information corresponding to the obtained keyword from information posted by each user account in the user account list to obtain a search result, and display the search result.

A search device includes:
a first processing module, configured to obtain a keyword, a relationship chain classification and a user account that are inputted by a user, and send the keyword, the relationship chain classification and the user account to a second processing module;
the second processing module, configured to obtain a user account list that corresponds to the obtained user account and belongs to the obtained relationship chain classification, and send the obtained keyword and the obtained user account list to a search module; and the search module, configured to search for information corresponding to the keyword from information posted by each user account in the user account list to obtain a search result, and display the search result.

As can be seen from the solution of the present disclosure, when the user is to search, a search range may be defined first. In this solution, only information posted by user accounts in a certain relationship chain classification may be searched. The relationship chain classification may be a relationship chain classification of friends of the user, a relationship chain classification of schoolmates of the user and a relationship chain classification of users followed by the user in a micro-blog. In this way, the possibility of obtaining spam information and false information may be decreased, and thus the practicability and reliability of information may be improved.

BRIEF DESCRIPTION OF THE DRAWINGS

The examples of the present disclosure will be illustrated hereinafter with reference to the accompanying drawings, thereby making those skilled in the art clearly learn the above and other features and advantages of the present disclosure.

DETAILED DESCRIPTION OF THE INVENTION

For a user, information posted by people in a circle of the user has practicability and reliability. Accordingly, in the solution of the present disclosure, when the user is to search, a search range may be defined first. In this solution, only information posted by user accounts in a certain relationship chain classification may be searched. The relationship chain classification may be a relationship chain classification of friends of the user, a relationship chain classification of schoolmates of the user and a relationship chain classification of users followed by the user in a micro-blog.

In order to make the technical solution and merits of the present disclosure clearer, the present disclosure will be illustrated in detail hereinafter with reference to the accompanying drawings and specific examples.

Figure 1:
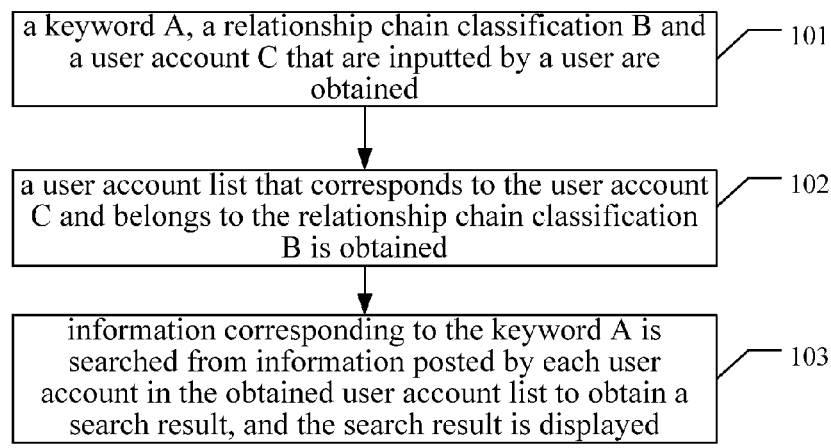
FIG. 1 is a schematic flowchart illustrating a search method according to an example of the present disclosure.

FIG. 1 is a schematic flowchart illustrating a search method according to an example of the present disclosure. As shown in FIG. 1. The search method includes following blocks.

At block 101, a keyword A, a relationship chain classification B and a user account C that are inputted by a user are obtained.

In order to distinguish from subsequent similar description, a keyword, a relationship chain classification and a user account that are inputted by the user are called the keyword A, the relationship chain classification B and the user account C respectively in this block.

In an implementation, a first processing module may display a search interface for the user, on which the user may input the keyword. On the search interface, several relationship chain classifications may also be presented to be selected by the user. For example, the several relationship chain classifications may include a relationship chain classification of friends of the user, a relationship chain classification of schoolmates of the user, and a relationship chain classification of users followed by the user in a micro-blog. When the user inputs the keyword A and selects the relationship chain classification B of friends, the first processing module sends the keyword A, the relationship chain classification B and the user account C obtained according to a conventional mode to a second processing module.

At block 102, a user account list that corresponds to the user account C and belongs to the relationship chain classification B is obtained.

In an implementation, a storage server may be configured, which is called a first storage server to be distinguished from subsequent storage servers. The first storage server may save user account lists that correspond to each user account and respectively belong to different relationship chain classifications. Taking a user X for instance, the first storage server may save a user account list of friends of the user X, a user account list of schoolmates of the user X and a user account list of users followed by the user X in the micro-blog. The generation method of these user account lists is not limited herein.

After receiving the keyword A, the relationship chain classification B and the user account C from the first processing module, the second processing module obtains the user account list that corresponds to the user account C and belongs to the relationship chain classification B from the user account lists saved by the first storage server, and sends the keyword A and the obtained user account list to a search module.

At block 103, information corresponding to the keyword A is searched from information posted by each user account in the obtained user account list to obtain a search result, and the search result is displayed.

In an implementation, an index database may be created, which includes information that is posted by each user account and is classified according to a predefined rule. The predefined rule includes classifying information posted by the same user account into the same information list and classifying information corresponding to the same keyword into the same information list. It should be noted that the predefined rule is only one of implementations and is not used to limit the solution of the present disclosure.

After receiving the keyword A and the user account list from the second processing module, the search module searches for the information corresponding to the keyword A from the information posted by each user account in the user account list in the index database to obtain the search result, and displays the search result through the first processing module.

The search process may be implemented as follows.

In an implementation, an information list corresponding to the keyword A and an information list corresponding to each user account in the user account list are obtained. An intersection of the information list corresponding to each user account and the information list corresponding to the keyword A is obtained, all obtained intersections are combined, and the combined intersections are sent to the second processing module as a search result. The second processing module sends the search result to the first processing module, and then the first processing module displays the search result for the user. In another implementation, the information list corresponding to the keyword A and the information list corresponding to each user account in the user account list are obtained. All information lists respectively corresponding to the user accounts in the user account list are combined. An intersection of the combined information lists and the information list corresponding to the keyword A is obtained. The intersection is sent to the second processing module as a search result. The second processing module sends the search result to the first processing module, and then the first processing module displays the search result for the user.

Data in the index database may be saved in a second storage server. The second storage server may be one server or one group of servers. For example, if the amount of data in the index database is large, one server is not enough to save the data, multiple servers may be configured. Each server corresponds to one index module.

Figure 2:
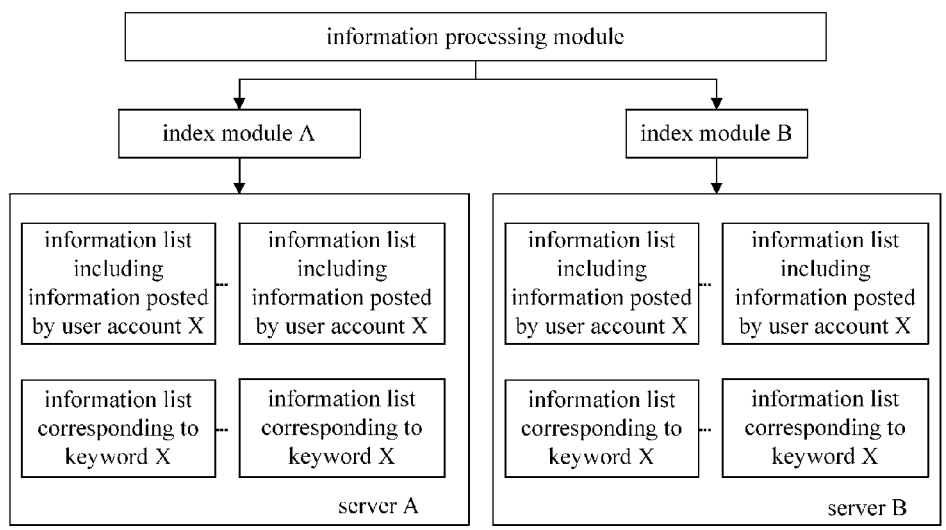
FIG. 2 is a schematic flowchart illustrating a process of creating an index database according to an example of the present disclosure.

FIG. 2 is a schematic flowchart illustrating a process of creating an index database according to an example of the present disclosure. As shown in FIG. 2, there are two servers, called a server A and a server B respectively. The server A corresponds to an index module A and the server B corresponds to an index module B. For each piece of information, an information processing module performs following operations according to a routing rule. For example, the information processing module performs a Message Digest algorithm 5 (MD5) for a user account corresponding to the information, and then performs a modulo operation to obtain a result. If the result is an odd number, the information processing module sends the information to the index module A. If the result is an even number, the information processing module sends the information to the index module B. The index module A or the index module B adds the received information into an information list including information posted by the user account corresponding to the information. The server A and the server B also save information lists corresponding to different keywords.

It is supposed that the server A saves an information list including information posted by a user account 1 and a user account 3, and the server B saves an information list including information posted by a user account 2 and a user account 4. For a keyword, for example, "Lijiang", the server A and the server B may also save an information list corresponding to "Lijiang" respectively. The information list corresponding to "Lijiang" that is saved in the server A includes information posted by the user account 1 and the user account 3, and the information list corresponding to "Lijiang" that is saved in the server B includes information posted by the user account 2 and the user account 4.

If there are multiple index modules, multiple search modules should be configured. That is, the index modules and the search modules are corresponding one by one, and the number of the index modules is the same as the number of the search modules.

At block 102, the second processing module may divide the obtained user account list into multiple sub-lists. For example, the second processing module may perform following operations for each user account in the user account list. The second processing module performs a MD5 for the user account and then performs a modulo operation to obtain a result. If the result is an odd number, the user account is added into a sub-list 1. If the result is an even number, the user account is added into a sub-list 2. The second processing module sends the sub-list 1 and the keyword A to the search module A corresponding to the index module A, and sends the sub-list 2 and the keyword A to the search module B corresponding to the index module B. Afterwards, the search module A and the search module B respectively obtain the information list corresponding to the keyword A and an information list corresponding to each user account in the sub-list, obtain an intersection of the information list corresponding to each user account and the information list corresponding to the keyword A, combine all intersections, and send the combined intersections to the second processing module as a search result. The second processing module combines the search result received from the search module A and the search result received from the search module B to obtain a final search result.

When the second storage server is composed of multiple servers, information saved in each server is not limited to the show of FIG. 2, but may be determined according to actual requirements. For example, when there are two servers, the server A may save information posted by each user account before 2011, and the server B may save information posted by each user account after 2011. In each server, the information posted by the same user account is classified into the same information list, and the information corresponding to the same keyword is classified into the same information list. In this way, at block 102, the second processing module does not need to divide the obtained user account list.

The method shown in FIG. 1 is described with reference to a following example.

Because the number of the second storage servers does not influence the solution of the present disclosure, it is supposed that there is one second storage server.

When the user X is to search, the user X inputs the keyword "Lijinag", and selects the relationship chain classification of users followed by the user in the micro-blog. The first processing module obtains the user account of the user X, and sends the user account of the user X, the keyword "Lijiang" and the relationship chain classification to the second processing module. The second processing module obtains a user account list List-X including user accounts of users followed by the user X in the micro-blog, and sends the List-X and the keyword "Lijiang" to the search module. The search module obtains an information list corresponding to the keyword "Lijiang" and an information list corresponding to each user account in the List-X. It is supposed that the List-X includes 3 user accounts. In an implementation, the search module obtains an intersection of the information list corresponding to each of the 3 user accounts and the information list corresponding to the keyword "Lijiang", combines three intersections to obtain a final search result. In another implementation, the search module combines the information lists respectively corresponding to the 3 user accounts into a large information list, then obtains an intersection of the large information list and the information list corresponding to the keyword "Lijiang", and takes the intersection as the final search result.

The forgoing is the method provided according to the example of the present disclosure.

As can be seen from the solution of the present disclosure, when the user is to search, a search range may be defined first. In this solution, only information posted by user accounts in a certain relationship chain classification may be searched. The relationship chain classification may be a relationship chain classification of friends of the user, a relationship chain classification of schoolmates of the user and a relationship chain classification of users followed by the user in a micro-blog. In this way, the possibility of obtaining spam information and false information may be decreased, and thus the practicability and reliability of information may be improved.

Figure 3:
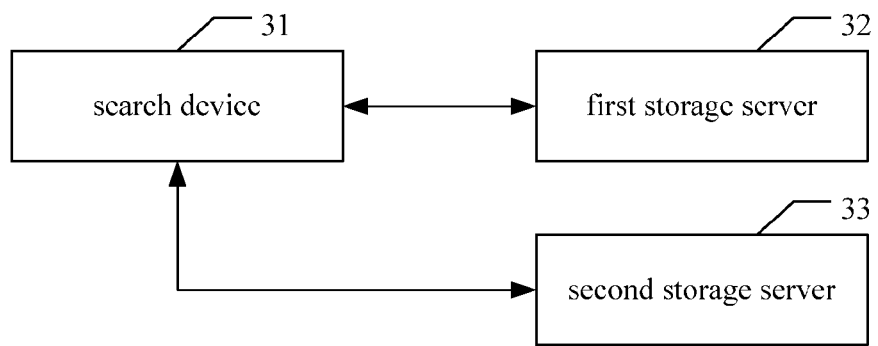
FIG. 3 is a schematic diagram illustrating the structure of a search system according to an example of the present disclosure.

FIG. 3 is a schematic diagram illustrating the structure of a search system according to an example of the present disclosure. As shown in FIG. 3, the search system includes:

a search device 31, configured to obtain a keyword, a relationship chain classification and a user account that are inputted by a user, obtain a user account list that corresponds to the obtained user account and belongs to the obtained relationship chain classification, search for information corresponding to the keyword from information posted by each user account in the user account list to obtain a search result, and display the search result.

The search system shown in FIG. 3 further includes:
a first storage server 32, configured to save user account lists that correspond to each user account and belong to different relationship chain classifications.

The search device 31 obtains the user account list that corresponds to the obtained user account and belongs to the obtained relationship chain classification from the first storage server 32.

The search system shown in FIG. 3 further includes:
a second storage server 33, configured to save data of an index database, wherein the index data saves information that is posted by each user account and is classified according to a predefined rule.

The search device 31 searches for the information corresponding to the obtained keyword from the information posted by each user account in the user account list in the index database to obtain the search result.

The predefined rule includes classifying information posted by the same user account into the same information list and classifying information corresponding to the same keyword into the same information list.

In an implementation, the search device 31 obtains an information list corresponding to the obtained keyword and an information list corresponding to each user account in the user account list, obtains an intersection of the information list corresponding to each user account and the information list corresponding to the keyword, combines all intersections, and takes the combined intersections as the search result.

In another implementation, the search device 31 obtains the information list corresponding to the keyword and the information list corresponding to each user account in the user account list, combines all information lists respectively corresponding to the user accounts in the user account list, obtains an intersection of the combined information lists and the information list corresponding to the keyword, and takes the intersection as the search result.

Figure 4:
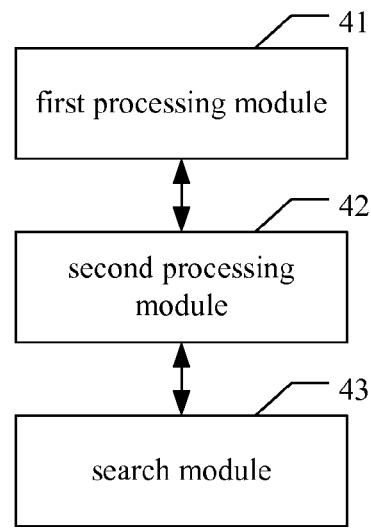
FIG. 4 is a schematic diagram illustrating the structure of a search device according to an example of the present disclosure.

FIG. 4 is a schematic diagram illustrating the structure of a search device according to an example of the present disclosure. As shown in FIG. 4, the search device includes following modules.

A first processing module 41 is configured to obtain a keyword, a relationship chain classification and a user account that are inputted by a user, and send the keyword, the relationship chain classification and the user account to a second processing module 42.

The second processing module 42 is configured to obtain a user account list that corresponds to the obtained user account and belongs to the obtained relationship chain classification, and send the obtained keyword and the obtained user account list to a search module 43.

The search module 43 is configured to search for information corresponding to the keyword from information posted by each user account in the user account list in the index database to obtain a search result, and displays the search result.

The second processing module 42 obtains the user account list that corresponds to the obtained user account and belongs to the obtained relationship chain classification from a first storage server, wherein the first storage server saves user account lists that correspond to each user account and respectively belong to different relationship chain classifications.

The search module 43 searches a second storage server for the information posted by each user account in the user account list and the information corresponding to the keyword to obtain the search result, wherein the second storage server saves an index database, and the index database saves information that is posted by each user account and is classified according to a predefined rule.

The predefined rule includes classifying information posted by the same user account into the same information list and classifying information corresponding to the same keyword into the same information list.

In an implementation, the search module 43 obtains an information list corresponding to the keyword and an information list corresponding to each user account in the user account list, obtains an intersection of the information list corresponding to each user account and the information list corresponding to the keyword, combines all intersections, and takes the combined intersections as the search result.

In another implementation, the search module 43 obtains the information list corresponding to the keyword and the information list corresponding to each user account in the user account list, combines all information lists respectively corresponding to the user accounts in the user account list, obtains an intersection of the combined information lists and the information list corresponding to the keyword, and takes the intersection as the search result.

The working flowchart of the system shown in FIG. 3 and the device shown in FIG. 4 may refer to the above method, and will not be described herein.

By the system and device provided according to the examples of the present disclosure, when the user is to search, a search range may be defined first. In this solution, only information posted by user accounts in a certain relationship chain classification may be searched. The relationship chain classification may be a relationship chain classification of friends of the user, a relationship chain classification of schoolmates of the user and a relationship chain classification of users followed by the user in a micro-blog. In this way, the possibility of obtaining spam information and false information may be decreased, and thus the practicability and reliability of information may be improved.

The methods and modules described herein may be implemented by hardware, machine-readable instructions or a combination of hardware and machine-readable instructions. Machine-readable instructions used in the examples disclosed herein may be stored in storage medium readable by multiple processors, such as hard drive, CD-ROM, DVD, compact disk, floppy disk, magnetic tape drive, RAM, ROM or other proper storage device. Or, at least part of the machine-readable instructions may be substituted by specific-purpose hardware, such as custom integrated circuits, gate array, FPGA, PLD and specific-purpose computers and so on.

A machine-readable storage medium is also provided, which is to store instructions to cause a machine to execute a method as described herein. Specifically, a system or apparatus having a storage medium that stores machine-readable program codes for implementing functions of any of the above examples and that may make the system or the apparatus (or CPU or MPU) read and execute the program codes stored in the storage medium.

In this situation, the program codes read from the storage medium may implement any one of the above examples, thus the program codes and the storage medium storing the program codes are part of the technical scheme.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

It should be noted that, alternatively to the program codes being executed by a computer, at least part of the operations performed by the program codes may be implemented by an operation system running in a computer following instructions based on the program codes to realize a technical scheme of any of the above examples.

In addition, the program codes implemented from a storage medium are written in a storage in an extension board inserted in the computer or in a storage in an extension unit connected to the computer. In this example, a CPU in the extension board or the extension unit executes at least part of the operations according to the instructions based on the program codes to realize a technical scheme of any of the above examples.

The foregoing is only preferred examples of the present disclosure and is not used to limit the protection scope of the present disclosure. Any modification, equivalent substitution and improvement without departing from the spirit and principle of the present disclosure are within the protection scope of the present disclosure.

What is claimed is:

1. A search method, comprising:
   obtaining a keyword, a relationship chain classification and a user account that are inputted by a user;
   obtaining a user account list that corresponds to the obtained user account and belongs to the obtained relationship chain classification; and
   searching for information corresponding to the obtained keyword from information posted by each user account in the user account list to obtain a search result, and displaying the search result;
   before obtaining the keyword, the relationship chain classification and the user account that are inputted by the user, the method further comprises:
   creating an index database, wherein the index database saves the information that is posted by each user account and is classified according to a predefined rule;
   wherein the predefined rule comprises classifying information posted by the same user account into the same information list and classifying information corresponding to the same keyword into the same information list; and
   the searching for the information corresponding to the obtained keyword from the information posted by each user account in the user account list to obtain the search result comprises:
   obtaining an information list corresponding to the obtained keyword and an information list corresponding to each user account in the user account list, obtaining an intersection of the information list corresponding to each user account and the information list corresponding to the obtained keyword, combining all intersections, and taking the combined intersections as a search result.

2. The search method of claim 1, wherein the obtaining the user account list that corresponds to the obtained user account and belongs to the obtained relationship chain classification comprises:
saving in advance user account lists that correspond to each user account and belong to different relationship chain classifications; and
obtaining the user account list that corresponds to the obtained user account and belongs to the obtained relationship chain classification from each saved user account list.

3. A search system, comprising:
a search device, configured to obtain a keyword, a relationship chain classification and a user account that are inputted by a user, obtain a user account list that corresponds to the obtained user account and belongs to the obtained relationship chain classification, search for information corresponding to the obtained keyword from information posted by each user account in the user account list to obtain a search result, and display the search result; and
a second storage server, configured to save data of an index database, wherein the index data saves the information that is posted by each user account and is classified according to a predefined rule; wherein the predefined rule comprises classifying information posted by the same user account into the same information list and classifying information corresponding to the same keyword into the same information list;
the search device is configured to obtain an information list corresponding to the obtained keyword and an information list corresponding to each user account in the user account list, obtain an intersection of the information list corresponding to each user account and the information list corresponding to the obtained keyword, combine all intersections, and take the combined intersections as the search result.

4. The search system of claim 3, further comprising:
a first storage server, configured to save user account lists that correspond to each user account and belong to different relationship chain classifications, wherein
the search device is configured to obtain the user account list that corresponds to the obtained user account and belongs to the obtained relationship chain classification from the first storage server.

5. A search device, comprising:
a first processing module, configured to obtain a keyword, a relationship chain classification and a user account that are inputted by a user, and send the keyword, the relationship chain classification and the user account to a second processing module;
the second processing module, configured to obtain a user account list that corresponds to the obtained user account and belongs to the obtained relationship chain classification, and send the obtained keyword and the obtained user account list to a search module; and
the search module, configured to search a second storage server for information corresponding to the keyword from information posted by each user account in the user account list to obtain a search result, and display the search result;
wherein the second storage server saves an index database, and the index database saves the information that is posted by each user account and is classified according to a predefined rule; the predefined rule comprises classifying information posted by the same user account into the same information list and classifying information corresponding to the same keyword into the same information list;
the search module is configured to obtain an information list corresponding to the keyword and an information list corresponding to each user account in the user account list, combine all information lists respectively corresponding to user accounts in the user account list, obtain an intersection of the combined information lists and the information list corresponding to the keyword, and take the intersection as the search result.

6. The search device of claim 5, wherein the second processing module is configured to obtain the user account list that corresponds to the obtained user account and belongs to the obtained relationship chain classification from a first storage server, wherein the first storage server saves user account lists that correspond to each user account and belong to different relationship chain classifications.

* * * * *